(12) United States Patent
Subramanya et al.

(10) Patent No.: US 11,182,840 B2
(45) Date of Patent: Nov. 23, 2021

(54) SYSTEMS AND METHODS FOR MAPPING A PREDICTED ENTITY TO A PRODUCT BASED ON AN ONLINE QUERY

(71) Applicant: WAL-MART STORES, INC., Bentonville, AR (US)

(72) Inventors: Shankara Bhargava Subramanya, Santa Clara, CA (US); Kushal Bhatt, Santa Clara, CA (US); Jun He, Fremont, CA (US); Luyang Chen, Stanford, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 735 days.

(21) Appl. No.: 15/355,789

(22) Filed: Nov. 18, 2016

(65) Prior Publication Data
US 2018/0144385 A1 May 24, 2018

(51) Int. Cl.
*G06Q 30/00* (2012.01)
*G06Q 30/06* (2012.01)
(Continued)

(52) U.S. Cl.
CPC ....... *G06Q 30/0627* (2013.01); *G06F 16/243* (2019.01); *G06F 16/24564* (2019.01);
(Continued)

(58) Field of Classification Search
CPC ............................ G06Q 30/0627; G06N 20/00
(Continued)

(56) References Cited

U.S. PATENT DOCUMENTS

| 7,747,601 B2 | 6/2010 | Cooper et al. |
| 8,781,813 B2 | 7/2014 | Cooper et al. |

(Continued)

OTHER PUBLICATIONS

Pennington, J., Socher, R., & Manning, C. (2014). Glove: Global vectors for word representation. In Proceedings of the 2014 conference on empirical methods in natural language processing (EMNLP) (pp. 1532-1543). (Year: 2014).*

(Continued)

*Primary Examiner* — Brittney N Miller
*Assistant Examiner* — Arielle E Weiner
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving an online query from an electronic device of a user, the online query comprising natural language of the user, determining an intent of the online query as at least one of a product-related intent or a non-product-related intent, predicting an entity from the online query if the intent of the online query is determined to be a product-related intent, mapping the entity predicted from the online query to product metadata associated with one or more products, and coordinating a display of product information of the one more products on the electronic device. The entity can include a product name, a product attribute, a product price range, an average customer review, or a product brand.

20 Claims, 5 Drawing Sheets

(51) Int. Cl.
*G06N 20/00* (2019.01)
*G06N 3/08* (2006.01)
*G06N 3/04* (2006.01)
*G06F 16/242* (2019.01)
*G06F 16/2455* (2019.01)
*G06N 5/04* (2006.01)

(52) U.S. Cl.
CPC ............ *G06N 3/0445* (2013.01); *G06N 3/08* (2013.01); *G06N 5/04* (2013.01); *G06N 20/00* (2019.01); *G06Q 30/0621* (2013.01)

(58) Field of Classification Search
USPC ........................................................ 705/26.5
See application file for complete search history.

(56) References Cited

U.S. PATENT DOCUMENTS

| | | |
|---|---|---|
| 8,898,140 B2 | 11/2014 | Cooper et al. |
| 9,262,528 B2 | 2/2016 | Cooper et al. |
| 2013/0144754 A1* | 6/2013 | Moser .................... G06Q 30/06 705/26.35 |
| 2014/0180815 A1 | 6/2014 | Chatwin et al. |
| 2014/0236939 A1 | 8/2014 | Wirtz et al. |
| 2014/0236940 A1 | 8/2014 | Wirtz et al. |
| 2014/0278959 A1 | 9/2014 | Nukala et al. |
| 2014/0279065 A1 | 9/2014 | Nukala et al. |
| 2015/0066496 A1* | 3/2015 | Deoras ................. G06N 3/0454 704/232 |
| 2015/0227973 A1* | 8/2015 | Wirtz .................... G06F 16/951 705/14.57 |
| 2016/0125048 A1* | 5/2016 | Hamada ............ G06F 16/24578 707/734 |
| 2016/0342895 A1* | 11/2016 | Gao ...................... G06N 3/0445 |
| 2017/0061330 A1* | 3/2017 | Kurata ................... G06N 3/084 |
| 2017/0103070 A1* | 4/2017 | He ..................... G06F 16/24522 |
| 2017/0150235 A1* | 5/2017 | Mei ........................ G06F 40/253 |
| 2017/0169017 A1* | 6/2017 | Byron ..................... G06F 16/35 |
| 2017/0177710 A1* | 6/2017 | Burlik ................... G06F 16/243 |
| 2017/0293638 A1* | 10/2017 | He ....................... G06F 16/5846 |
| 2017/0330054 A1* | 11/2017 | Fu ........................ G06N 3/0454 |
| 2017/0357635 A1* | 12/2017 | Mohaideen ............. G10L 15/16 |

OTHER PUBLICATIONS

Ma, Jianqiang. "All of Recurrent Neural Networks." Medium, Medium, Apr. 2, 2016, medium.com/@jianqiangma/all-about-recurrent-neural-networks-9e5ae2936f6e. (Year: 2016).*

Pennington, J., Socher, R., & Manning, C. (2014). Glove: Global vectors for word representation. In Proceedings of the 2014 conference on empirical methods in natural language processing (EMNLP) (pp. 1532-1543). (Year: 2014).*

Jansen, B.J., Booth, D.L., and Spink, A., Determining the Informational, Navigational, and Transactional Intent of Web Queries, Elsevier Ltd., pp. 1251-1266 Sep. 11, 2007.

* cited by examiner

400

| 405 – Receiving an online query from an electronic device of a user. |

| 410 – Obtaining a first set of rules that define an intent of the online query as at least one of a product-related intent or a non-product-related intent. |

| 415 – Determining the intent of the online query based on the first set of rules. |

| 420 – Obtaining a second set of rules that define an entity prediction from the online query if the intent of the online query is determined to be the product-related intent. |

| 425 – Predicting an entity from the online query based on the second set of rules. |

| 430 – Mapping the entity predicted from the online query to product metadata associated with one or more products. |

| 435 – Determining a physical store that is closest to the electronic device when the online query is received from the electronic device of the user. |

| 440 – Determining whether the one or more products are available for purchase at the physical store that is closest to the electronic device. |

| 445 – Obtaining a third set of rules that define a personalization of the one or more products for display on the electronic device of the user based on at least one of an online order history of the user, an in-store purchase history of the user, or an online browsing history of the user. |

| 450 – Coordinating a display of the product information of the one or more products on the electronic device of the user. |

FIG. 4

SYSTEMS AND METHODS FOR MAPPING A PREDICTED ENTITY TO A PRODUCT BASED ON AN ONLINE QUERY

TECHNICAL FIELD

This disclosure relates generally to mapping a predicted entity to a product based on an online query.

BACKGROUND

Natural language processing is utilized in interactions between humans and computers. Conventional systems utilizing natural language processing have difficulty determining intent of natural language. In particular, conventional natural language processing can misunderstand natural language of a user pertaining to ecommerce queries, which can result in a customer receiving incorrect or undesired information in response to an ecommerce query.

BRIEF DESCRIPTION OF THE DRAWINGS

To facilitate further description of the embodiments, the following drawings are provided in which:

FIG. 4 is a flowchart for a method, according to certain embodiments;

Figure 1:
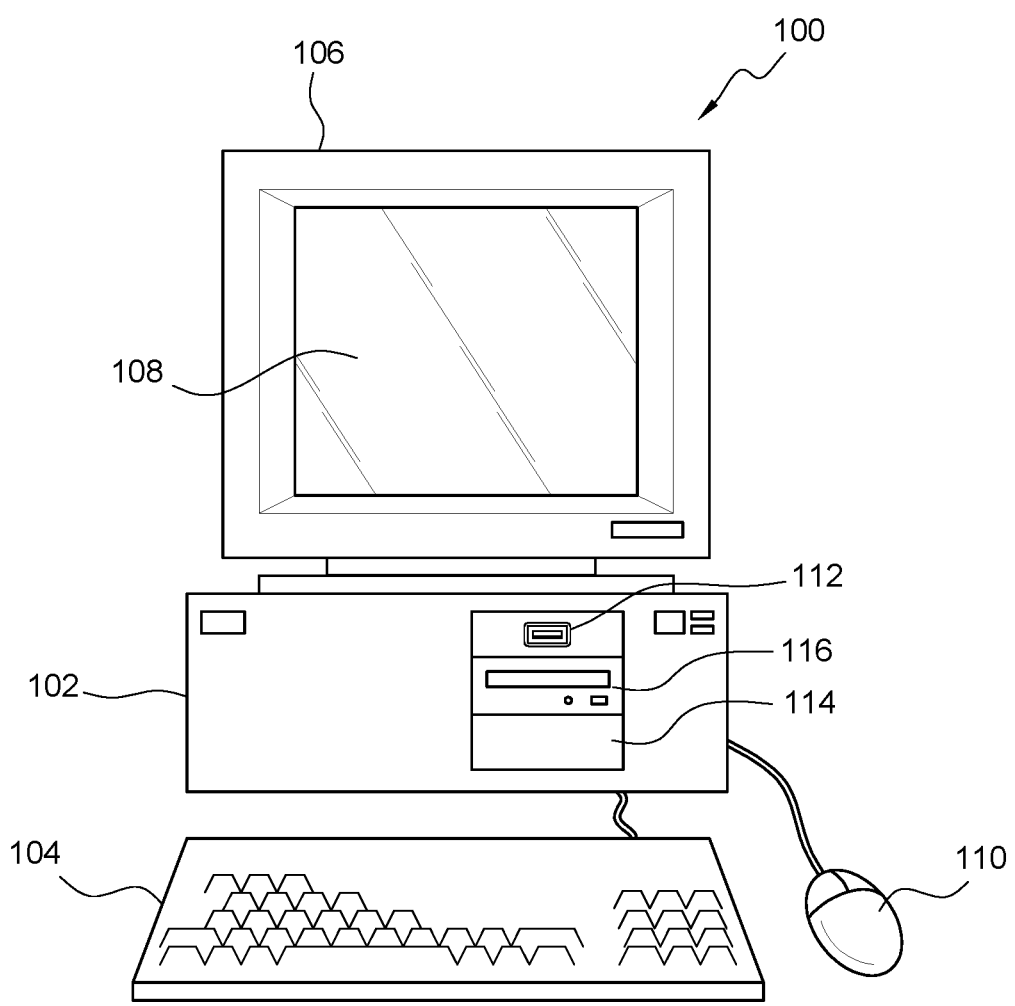
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform the act of receiving an online query from an electronic device of a user, the online query comprising natural language of the user. The one or more storage modules can be configured to run on the one or more processing modules and perform the act of obtaining a first set of rules that define an intent of the online query as at least one of a product-related intent or a non-product-related intent. The one or more storage modules can be configured to run on the one or more processing modules and perform the act of determining the intent of the online query based on the first set of rules. The one or more storage modules can be configured to run on the one or more processing modules and perform the act of obtaining a second set of rules that define an entity prediction from the online query if the intent of the online query is determined to be the product-related intent. The one or more storage modules can be configured to run on the one or more processing modules and perform the act of predicting an entity from the online query based on the second set of rules, the entity comprising one or more of a product name, a product attribute, a product price range, an average customer review, or a product brand. The one or more storage modules can be configured to run on the one or more processing modules and perform the act of mapping the entity predicted from the online query to product metadata associated with one or more products. The one or more storage modules can be configured to run on the one or more processing modules and perform the act of coordinating a display of product information of the one more products on the electronic device of the user.

Various embodiments include a method. The method can include receiving an online query from an electronic device of a user, the online query comprising natural language of the user. The method also can include obtaining a first set of rules that define an intent of the online query as at least one of a product-related intent or a non-product-related intent. The method also can include determining the intent of the online query based on the first set of rules. The method also can include obtaining a second set of rules that define an entity prediction from the online query if the intent of the online query is determined to be the product-related intent. The method also can include predicting an entity from the online query based on the second set of rules, the entity comprising one or more of a product name, a product attribute, a product price range, an average customer review, or a product brand. The method also can include mapping the entity predicted from the online query to product metadata associated with one or more products. The method also can include coordinating a display of product information of the one more products on the electronic device of the user.

A number of embodiments can include a system. The system can include one or more processing modules and one or more non-transitory storage modules storing computing instructions configured to run on the one or more processing modules. The one or more storage modules can be configured to run on the one or more processing modules and perform the act of receiving an online query from an electronic device of a user, the online query comprising natural language of the user. The one or more storage modules can be configured to run on the one or more processing modules and perform the act of determining an intent of the online query as at least one of a product-related intent or a non-product-related intent. The one or more storage modules can be configured to run on the one or more processing modules and perform the act of predicting an entity from the online query if the intent of the online query is determined to be a product-related intent, the entity comprising one or more of a product name, a product attribute, a product price range, an average customer review, or a product brand. The one or more storage modules can be configured to run on the one or more processing modules and perform the act of mapping the entity predicted from the online query to product metadata associated with one or more products. The one or more storage modules can be configured to run on the one or more processing modules and perform the act of coordinating a display of product information of the one more products on the electronic device of the user.

Natural language understanding can be an important aspect of the online retail experience, including automated customer support assistants, voice-based user interfaces in applications, home automation hubs, and the like. As shall be described in greater detail herein, contemplated as part of this disclosure is an automatic system configured to (1) understand the intents of online queries from customers or users, and (2) map the question of the online query to product metadata to support multiple ecommerce uses. Computer systems according to this disclosure can comprise an interface to accept a customer's input as either voice input or text input, one or more pre-trained machine learning language models configured to understand human questions, and a response designer configured to make an appropriate response to a customer after understanding a human question presented as an online query.

For example, when a customer asks a question or enters a phrase in an online query, the computer system can understand the online query and extract useful information from the online query, such as but not limited to an intent of the question and also entities related to the intent of the question or phrase. For an intent, the computer system can be configured to understand and determine what a customer wants from the online query, e.g., to search for a product or file a complaint. For entities, the computer system can be configured to determine what the customer is looking for if the intent is determined to be a product-related intent, or alternatively what the customer would like to complain about or give feedback about if the intent is determined to be a non-product-related intent.

After understanding the online query from the customer and extracting useful information such as one or more entities from the online query, a response designer system of the computer system is configured to prepare an appropriate, human-like response. For example, when the intent of the online query is determined to be a product-related intent, the response designer system can be configured to prepare a response with product information for one or more products. The product information can be specific to an online retailer or a physical store associated with the online retailer. By way of another example, when the intent of the online query is determined to be a non-product-related intent such as filing a complaint, the response designer system can be configured to prepare a response that informs the custom that a customer support assistant will be with them to deal with the issue.

As shall be described in greater detail below, deep neural network models for natural language understanding can be utilized to determine an intent and one or more entities within natural language of an online query from a customer. Deep neural networks can be useful tools to respond to natural language processing problems. Given relatively large amounts of training examples, computer systems according to this disclosure can learn from these examples and predict accurately for other unseen examples.

Figure 2:
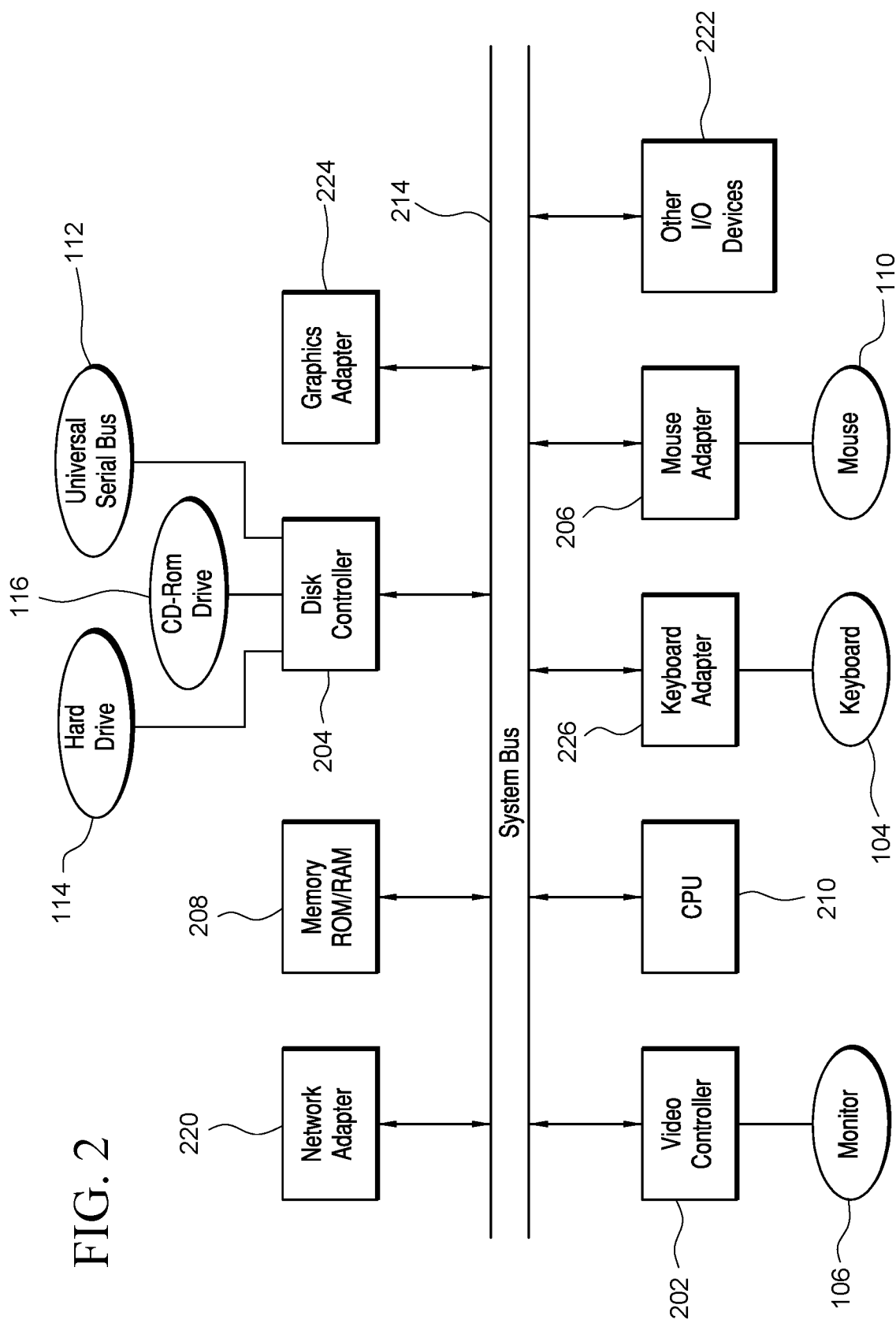
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
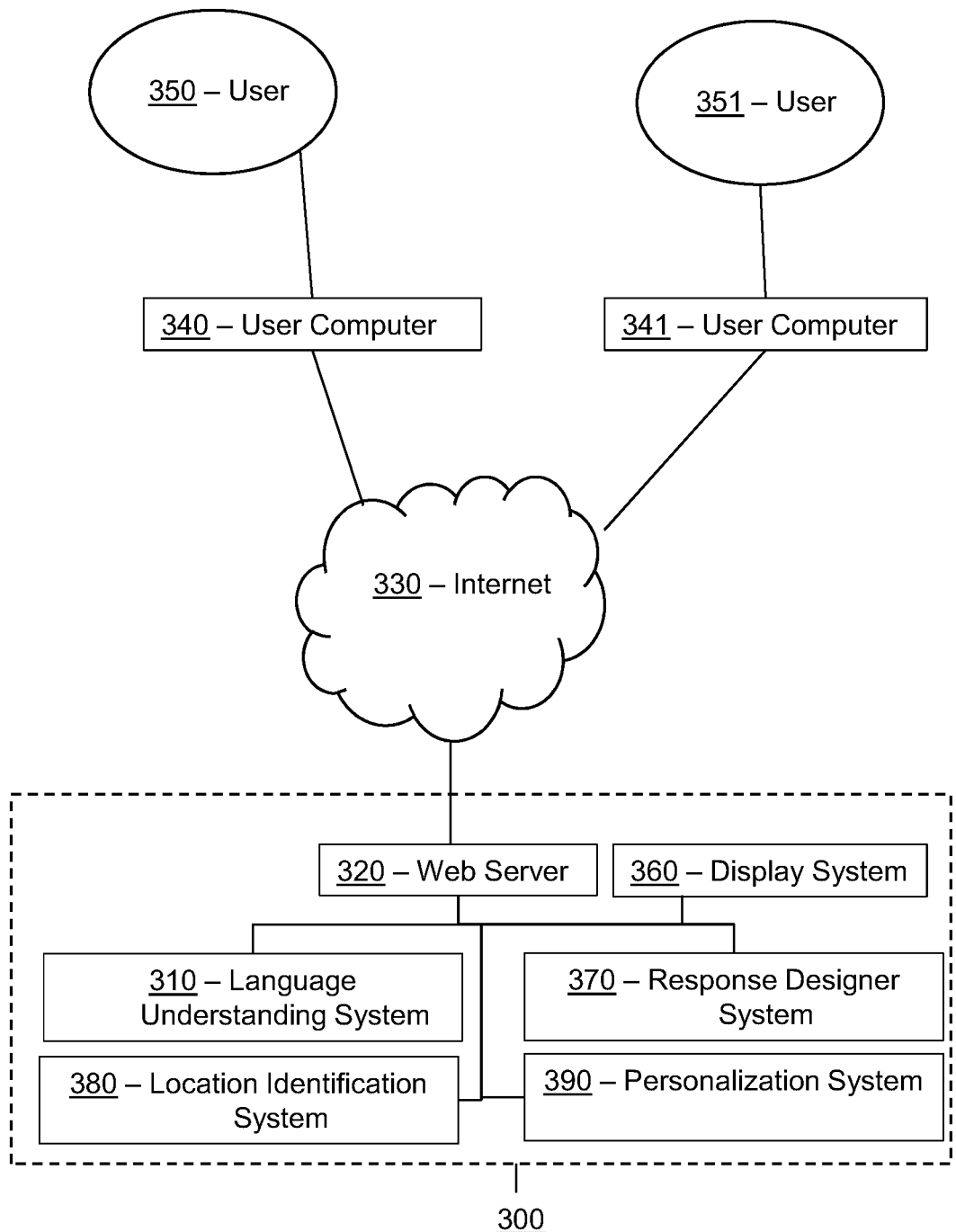
FIG. 3 illustrates a representative block diagram of a system, according to an embodiment.

Turning ahead in the drawings, FIG. 3 illustrates a block diagram of a system 300 that can be employed for mapping a predicted entity to a product based on a search query described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a language understanding system 310, a web server 320, a display system 360, a response designer system 370, a location identification system 380, and/or a personalization system 390. Language understanding system 310, web server 320, display system 360, response designer system 370, location identification system 380, and/or personalization system 390 can each be a computer system, such as computer system 100 (FIG. 1), as described above, and can each be a single computer, a single server, or a cluster or collection of computers or servers, or a cloud of computers or servers. In another embodiment, a single computer system can host each of two or more of language understanding system 310, web server 320, display system 360, response designer system 370, location identification system 380, and/or personalization system 390 as described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, language understanding system 310, web server 320, display system 360, response designer system 370, location identification system 380, and/or personalization system 390 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) language understanding system 310, web server 320, display system 360, response designer system 370, location identification system 380, and/or personalization system 390 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of language understanding system 310, web server 320, display system 360, response designer system 370, location identification system 380, and/or personalization system 390. In a similar manner, the processing module(s) and the memory storage module(s) can be local and/or remote to each other.

In many embodiments, language understanding system 310, web server 320, display system 360, response designer system 370, location identification system 380, and/or personalization system 390 can be configured to communicate with one or more customer computers 340 and 341. In some embodiments, customer computers 340 and 341 also can be referred to as user computers. In some embodiments, language understanding system 310, web server 320, display system 360, response designer system 370, location identification system 380, and/or personalization system 390 can communicate or interface (e.g. interact) with one or more customer computers (such as customer computers 340 and 341) through a network or internet 330. Internet 330 can be an intranet that is not open to the public. Accordingly, in many embodiments, language understanding system 310, web server 320, display system 360, response designer system 370, location identification system 380, and/or personalization system 390 (and/or the software used by such systems) can refer to a back end of system 300 operated by an operator and/or administrator of system 300, and customer computers 340 and 341 (and/or the software used by such systems) can refer to a front end of system 300 used by one or more customers 350 and 351, respectively. In some embodiments, customers 350 and 351 also can be referred to as users. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, language understanding system 310, web server 320, display system 360, response designer system 370, location identification system 380, and/or personalization system 390 also can be configured to communicate with one or more databases. The one or more databases can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between language understanding system 310, web server 320, display system 360, response designer system 370, location identification system 380, and/or personalization system 390, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zig-bee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
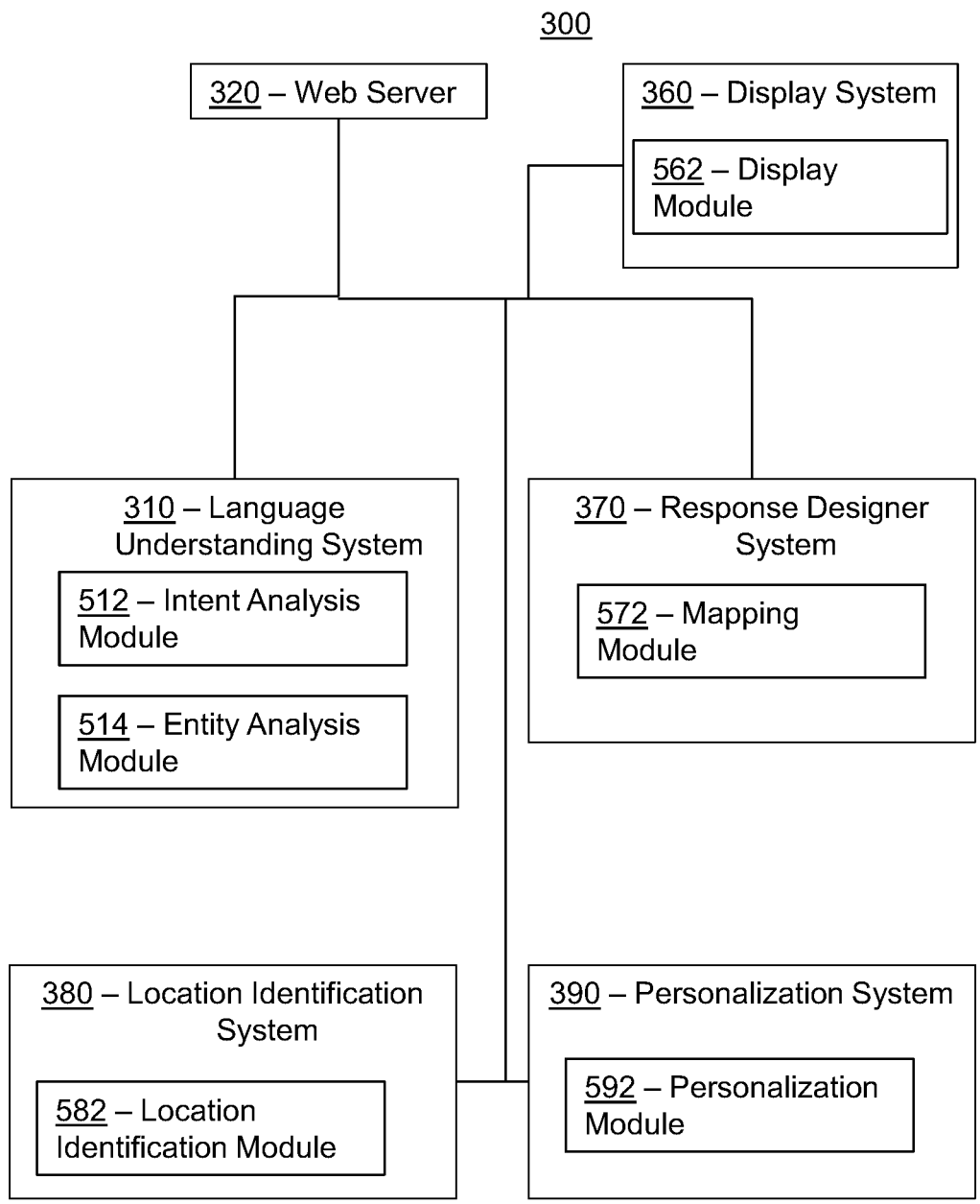
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, 562, 572, 582, 592 (FIG. 5). Such non-transitory memory storage modules can be part of a computer system such as language understanding system 310, web server 320, display system 360, response designer system 370, location identification system 380, and/or personalization system 390 (FIGS. 3 & 5). The processing module(s) can be similar or identical to the processing module(s) described above with respect to computer system 100 (FIG. 1).

Method 400 can comprise an activity 405 of receiving an online query from an electronic device of a user. In some embodiments, the online query can comprise natural language of the user. More particularly, the online query can comprise natural language inputs entered into a user computer 340 or 341 (FIG. 3) from a customer or user 350 or 351 (FIG. 3). The natural language inputs can be entered into the user computer 340 or 341 as either natural language voice inputs or natural language text inputs. If the natural language input is entered into the user computer 340 or 341 as a natural language voice input, the user computer 340 or 341 can convert the natural language voice input into a natural language text input, by way of non-limiting example, with voice recognition modules or techniques. Upon capturing the natural language input from user 350 or 351, user computer 340 or 341, as an electronic device, can transmit the natural language input as the online query through internet 330 and web server 320 to language understanding system 310.

Returning to FIG. 4, method 400 can next comprise an activity 410 of obtaining a first set of rules that define an intent of the online query as at least one of a product-related intent or a non-product-related intent. For example, a product-related intent can comprise a request to search for one or more products, and a non-product-related intent can comprise request to file a complaint or provide customer feedback. In some embodiments, the first set of rules can be a set of natural language processing rules.

In some embodiments, the first set of rules that define an intent of the online query as at least one of a product-related intent or a non-product-related intent can comprise one or more neural network models. More particularly, the first set of rules can comprise one or more models that utilize a deep learning neural network model to define an intent of the online query. By way of example, a recurrent neural network (RNN) model or a long-short-term-memory (LSTM) model can be utilized by intent analysis module 512 (FIG. 5) to understand or define an intent of the natural language of the online query. According to some aspects, the one or more models of the first set of rules that define an intent of the online query as at least one of a product-related intent or a non-product-related intent can be pre-trained using text data with ground truth and hosted on a server.

In some embodiments, the first set of rules that define an intent of the online query as at least one of a product-related intent or a non-product-related intent can comprise one or more neural network models that utilize the RNN model. The RNN model as utilized in an embodiment of the first set of rules can take the text of the natural language of the online query as input, and output the most likely intent and the probability of that specific and mostly likely intent. More particularly, the first set of rules that define an intent of the online query as at least one of a product-related intent or a non-product-related intent can comprise converting the online query into a sequence of word vectors $\{x_t\}^T$, where x is a word vector, t is an index of a plurality of hidden layers, T is a total number of the plurality of hidden layers, and each hidden layer of the plurality of hidden layers comprises a hidden dimension vector $\{h_{t-1}\}^T$ input, a corresponding word vectors $\{x_t\}^T$ input, and an output $\{h_t\}^T$ as an input for a next hidden layer of the plurality of hidden layers, where h is a hidden dimension. Each sentence can be converted into a sequence of word vectors using, by way of example, a global vectors for word representation (GloVe) method. The first set of rules that define an intent of the online query as at least one of a product-related intent or a non-product-related intent can further comprise applying a formula $$h_t = \sigma(h_{t-1}H + x_t W),$$

where H and W are a training parameter matrix used to learn from training data, and $\sigma$ is a sigmoid function $$\sigma(z) = \frac{1}{1+e^{-z}}$$

where z is a dummy variable and e is an exponential function. The first set of rules that define an intent of the online query as at least one of a product-related intent or a non-product-related intent can further comprise inserting the output from a last hidden layer $h_T$ into a softmax function to obtain a probability over all a plurality of intents as $$\hat{y} = s(h_T U + b)$$

where $\hat{y}$ is a final output after softmax transformation, s is the softmax function $$s(z_i) = \frac{e^{z_i}}{\sum_{j=1}^{n} \sum_j e^{z_j}},$$

n is a total number of the plurality of intents, i and j are indexes for summation. Matrices $W \in R^{d \times h}$, $H \in R^{h \times h}$, $U \in R^{h \times n}$ and $b \in R^{1 \times h}$ can be model parameters that are determined by model training where R is defined as a real number set. The first set of rules that define an intent of the online query as at least one of a product-related intent or a non-product-related intent can further comprise manually labeling each training example with an intent of the plurality of intents. The first set of rules that define an intent of the online query as at least one of a product-related intent or a non-product-related intent can further comprise predicting a probability for each position in y to be 1 with the softmax function, where y is a one-hop vector that represents a true label of the online query and where only a position corresponding to the intent as manually labeled takes value 1 and a remainder of positions in the one-hop vector take value 0. The first set of rules that define an intent of the online query as at least one of a product-related intent or a non-product-related intent can further comprise optimizing the model parameters by minimizing cross-entropy loss $$-\frac{1}{N} \sum_{k=1}^{N} \sum_{i=1}^{n} y_i^{(k)} \log(\hat{y}_i^{(k)})$$

where N is a number of training examples to effectively minimizes the error of model output $\hat{y}$ compared with ground-truth label y. The first set of rules that define an intent of the online query as at least one of a product-related intent or a non-product-related intent can further comprise using a stochastic gradient descent method for batch parameter optimization. The first set of rules that define an intent of the online query as at least one of a product-related intent or a non-product-related intent can further comprise calculating $\hat{y}$ using optimized parameters and a highest probability intent of the plurality of intents having a highest probability given by $\hat{y}$ as a final predicted intent to make a prediction after training.

In some embodiments, a LSTM model can be utilized in the first set of rules that define an intent of the online query as at least one of a product-related intent or a non-product-related intent. The LSTM model can be a variant of the RNN model, and can receive input and give output in the same format and formula as described above in relation to the RNN model.

Then, method 400 can comprise an activity 415 of determining the intent of the online query based on the first set of rules. In determining the intent of the online query based on the first set of rules, system 300 (FIG. 3) can determine and understand what user 350 or 351 wants from the natural language online query, e.g. a product-related intent or a non-product-related intent. If the intent of the online query is determined to be the non-product-related intent, response designer system 370 (FIGS. 3 and 5) can design a response that informs user 350 or 351 (FIG. 3) that customer support will contact user 350 or 351 shortly regarding the non-product-related intent. Response designer system 370 can be configured to handle the logics to respond to various intent scenarios as determined based on the first set of rules, and resort to a knowledge base to obtain or prepare an appropriate response.

By way of non-limiting example, a natural language online query can comprise "I want to buy a 43-inch Samsung TV." System 300 can be configured to determine the intent of the query "I want to buy a 43-inch Samsung TV" based on the first set of rules. After applying the first set of rules, system 300 can determine that the intent of the query "I want to buy a 43-inch Samsung TV" is a product-related intent, as well as a confidence level associated with this prediction.

Returning to FIG. 4, method 400 can subsequently comprise an activity 420 of obtaining a second set of rules that define an entity prediction from the online query if the intent of the online query is determined to be the product-related intent. For example, entity analysis module 514 (FIG. 5) can be configured to utilize a neural network model to extract one or more entities from text data of the natural language online query. Models used in the second set of rules that define an entity prediction from the online query if the intent of the online query is determined to be the product-related intent can be pre-trained using text data with ground truth. In some embodiments, the second set of rules can be natural language processing rules.

More particularly, in some embodiments, the second set of rules that define an entity prediction from the online query if the intent of the online query is determined to be the product-related intent can comprise determining a context of a word in the online query by representing context as a window comprising the word concatenated with additional words neighboring the word on both sides as $$x^{(t)} = [x_{t-k}, \ldots, x_t, \ldots, x_{t+k}]$$

where x is a word vector, t is an index of a plurality of hidden layers, $\{x_i\}_{i=t-k}^{t+k}$ is a word vector representation of word $x_t$ and the additional words, k is a word window size. The second set of rules that define an entity prediction from the online query if the intent of the online query is determined to be the product-related intent can further comprise predicting the entity of the word $x_t$. The second set of rules that define an entity prediction from the online query if the intent of the online query is determined to be the product-related intent can further comprise calculating a hidden layer $$h = \tan h(x^{(t)}W + b_1)$$

to get a probability of each entity of a plurality of entities by $$\hat{y} = s(hU + b_2)$$

where tan h is the hyperbolic tangent function, W is first matrix variables for training, $b_1$ and $b_2$ are intercept variables for training, $\hat{y}$ is an output from a logistic function, h is an output from a tan h function, and s is a softmax function, a ground-truth label of the entity for the word s represented as a one-hop vector y. The second set of rules that define an entity prediction from the online query if the intent of the online query is determined to be the product-related intent can further comprise optimizing parameters $W \in R^{(2k+1) \times h}$, $b_1 \in R^h$, $U \in R^{h \times n}$, $b_2 \in R^n$ by minimizing a cross-entropy loss using a stochastic gradient descent method and a batch optimization, where U is second matrix variables for training, R is defined as a real number set, and h and n are dimensions of a matrix. After training, the parameters can be fixed and unseen examples can be predicted.

Method 400 can next comprise an activity 425 of predicting an entity from the online query based on the second set of rules. The entity can comprise one or more of a product name, a product attribute, a product price range, an average customer review, or a product brand. As described above, in some embodiments, RNN for recognizing one or more entities in the natural language online query can receive the online query text as input, break the sentence or phrase of the online query into tokens of words or punctuations, and output the most likely entity and the probability for every token. Accordingly, predicting the entity from the online query based on the second set of rules can comprise predicting a plurality of entities and a confidence level for each entity of the plurality of entities from the online query based on the second set of rules.

By way of reference to the non-limiting example provided above, a natural language online query can comprise a phrase "I want to buy a 43-inch Samsung TV." After determining that the intent of the online query is product-related based on the first set of rules, system 300 (FIG. 3) is configured to predict or otherwise determine one or more entities from the online query of "I want to buy a 43-inch Samsung TV" based on the second set of rules. In predicting one or more entities based on the second set of rules, system 300 (FIG. 3) and method 400 can determine an entity product name of a "TV," an entity product attribute of "43-inches," and an entity product brand of "Samsung." System 300 and method 400 also can predict a confidence level for each of the predicted entities. For example, a confidence level for the predicted entity product attribute of "43-inches" can comprise 0.91, a confidence level for the predicted entity product brand of "Samsung" can comprise 0.99, and a confidence level for the predicted entity product name of "TV" can comprise 0.99.

In some embodiments, after activity 415 of determining the intent of the online query based on the first set of rules and activity 425 of predicting an entity from the online query based on the second set of rules, language understanding system 310 (FIGS. 3 and 5) is configured to generate the intent as predicted and the entity as predicted in a results report, such as but not limited to a uniform j son format or a user interface displaying the intent as predicted and the entity as predicted. The results report can be transmitted to response designer system 370 (FIGS. 3 and 5) to generate a response for transmission to the electronic device of the user.

Returning to FIG. 4, method 400 can subsequently comprise an activity 430 of mapping the entity predicted from the online query to product metadata associated with the one or more products. More particularly, the one or more entities comprising a product name, a product attribute, a product price range, an average customer review, and/or a product brand can be compared against an ecommerce product database, where metadata information about products is maintained. The metadata information about the products can comprise brand, color, size, model number, product type, as well as specialized attributes related only to certain products such as tire pressure, screen size, game console platform, and the like. All of these metadata types can be used as entities to train one or more of the entities models of the second set of rules as described above, and the second set of rules can be applied to identify metadata types of words within the online query. Once the one or more entities as predicted based on the second set of rules are matched to metadata in the database, the entities can be used as filters in the search application program interface to precisely identify one or more products.

Then, method 400 can optionally comprise an activity 435 of determining a physical store that is closest to the electronic device when the online query is received from the electronic device of the user. The physical store can comprise a physical store associated with an online retailer. Activity 435 of determining the physical store that is closest to the electronic device when the online query is received from the electronic device of the user can comprise determining a distance between the electronic device of the user and a physical store using global positioning system (GPS) data, geofencing, and/or any other systems for determining a geographic location of an electronic device. In some embodiments, activity 435 of determining the physical store that is closest to the electronic device when the online query is received from the electronic device of the user can comprise receiving location information entered into the electronic device by the user and determining what physical store associated with the online retailer is closest to the location information entered into the electronic device by the user. In some embodiments, location identification system 380 (FIGS. 3 and 5) is configured to determine a plurality of physical stores within a predetermined proximity to the location of the electronic device or location information entered by the user, and system 300 is configured to coordinate display of the plurality of physical stores to the user on the electronic device of the user for the user to select a preferred physical store.

Returning to FIG. 4, method 400 can next comprise an activity 440 of determining whether the one or more products are available for purchase at the physical store that is closest to the electronic device. In some embodiments, activity 440 of determining whether the one or more products are available for purchase at the physical store that is closest to the electronic device can comprise determining whether the one or more products are available for purchase at the physical store that is closest to the electronic device and/or the physical store as selected by the user. If the one or more products are determined to be available for purchase at the physical store that is closest to the electronic device of the user or as selected by the user, response designer system 370 (FIGS. 3 and 5) can be configured to determine a location of the one or more products at the physical store and/or determine a price for the one or more products at the physical store.

Returning to FIG. 4, method 400 can next optionally comprise an activity 445 of obtaining a third set of rules that define a personalization of the one or more products for display on the electronic device of the user based on at least one of an online order history of the user, an in-store purchase history of the user, or an online browsing history of the user. Method 400 can further comprise personalizing the one or more products according to the third set of rules based on at least one of an online order history of the user, an in-store purchase history of the user, or an online browsing history of the user. Personalization can comprise particular features of products or services that a customer has purchased or for which the customer has browsed, such as but not limited to a product name, a product attribute, a product price range, an average customer review, or a product brand.

In some embodiments, mapping the entity predicted from the online query to the product metadata associated with the one or more products comprises mapping the entity predicted from the online query to the product metadata associated with the one or more products based on the third set of rules. Thus, in various embodiments, the entity as predicted can be mapped to product metadata that is associated with (1) the one or more products in general, (2) the one or more products at a specific physical store, (3) the one or more products as personalized to the user, and/or (4) the one or more products at a specific physical store and as personalized to the user.

By way of example and not limitation, a user may enter as an online query the phrase "I want to buy milk." Personalization system 390 (FIGS. 3 and 5) can obtain the third set of rules, and personalize the online query by determining that the user has previously purchased or browsed for organic milk. As such, mapping the entity predicted from the online query to the product metadata associated with the one or more products based on the third set of rules would result in mapping to organic milk rather than non-organic milk. Additionally or alternatively, personalization system 390 can obtain the third set of rules, and personalize the online query by determining that the user has previously purchased or browsed for a particular brand of milk. As such, mapping the entity predict from the online query to the product metadata associated with the one or more products based on the third set of rules would result in mapping to the particular brand of milk. If the location of a physical store has been determined, mapping the entity predicted from the online query to the product metadata associated with the one or more products based on the third set of rules would result in mapping to organic milk at the physical store rather than non-organic milk.

Returning to FIG. 4, method 400 also can comprise an activity 450 (after activities 430, 440, and/or 445) of coordinating a display of the product information of the one or more products on the electronic device of the user. The product information can be in the form of a webpage for the one or more products and can be designed by response designer system 370 (FIGS. 3 and 5). In embodiments wherein a physical store that is closest to the electronic device has been determined or a particular physical store has been selected by the user as described above, the product information coordinated for display can comprise at least one of a price for the one or more products within the physical store or a location of the one or more products at the physical store. Returning to the non-limiting example provided above, if a user entered an online query of "I want to buy milk," the product information coordinated for display to the user can comprise a price of milk within the physical store and/or a location of milk at the physical store.

In embodiments wherein personalization of the one or more products for display has been determined as described above, the product information coordinated for display can comprise personalized product information. Returning to the non-limiting example provided above, if a user entered an online query of "I want to buy milk" and has purchased or browsed for organic milk, the product information coordinated for display to the user can comprise organic milk rather than non-organic milk. Alternatively or additionally, returning to the non-limiting example provided above, if a user entered an online query of "I want to buy milk" and has purchased or browsed for a particular brand of milk, the product information coordinated for display to the user can comprise the particular brand of milk that the user has purchased or browsed.

In embodiments wherein personalization of the one or more products for display has been determined and a physical store that is closest to the user has also been determined, the product information coordinated for display can comprise at least one of a price for the personalized product at the physical store and/or a location of the personalized product at the physical store. Returning to the non-limiting example provided above, if a user entered an online query of "I want to buy milk" and has purchased or browsed for organic milk, the product information coordinated for display to the user can comprise a price of organic milk at the physical store and/or a location of organic milk at the physical store. Alternatively or additionally, returning to the non-limiting example provided above, if a user entered an online query of "I want to buy milk" and has purchased or browsed for a particular brand of milk, the product information coordinated for display to the user can comprise a price of the particular brand of milk at the physical store and/or a location of the particular brand of milk at the physical store.

FIG. 5 illustrates a block diagram of a portion of system 300 comprising language understanding system 310, web server 320, display system 360, response designer system 370, location identification system 380, and personalization system 390, according to the embodiment shown in FIG. 3. Each of language understanding system 310, web server 320, display system 360, response designer system 370, location identification system 380, and personalization system 390, is merely exemplary and not limited to the embodiments presented herein. Each of language understanding system 310, web server 320, display system 360, response designer system 370, location identification system 380, and personalization system 390, can be employed in many different embodiments or examples not specifically depicted or described herein. In some embodiments, certain elements or modules of language understanding system 310, web server 320, display system 360, response designer system 370, location identification system 380, and/or personalization system 390 can perform various procedures, processes, and/or acts. In other embodiments, the procedures, processes, and/or acts can be performed by other suitable elements or modules.

In many embodiments, language understanding system 310 can comprise non-transitory memory storage modules 512 and 514, display system 360 can comprise non-transitory memory storage module 562, response design system 370 can comprise non-transitory memory storage module 572, location identification system 380 can comprise non-transitory memory storage module 582, and personalization system 390 can comprise non-transitory memory storage module 592. Memory storage module 512 can be referred to as intent analysis module 512, and memory storage module 514 can be referred to as entity analysis module 514. Memory storage module 562 can be referred to as display module 562. Memory storage module 572 can be referred to as mapping module 572. Memory storage module 582 can be referred to location identification module 582. Memory storage module 592 can be referred to as personalization module 592.

In many embodiments, intent analysis module 512 can store computing instructions configured to run on one or more processing modules and perform one or more acts of method 400 (FIG. 4) (e.g. activity 405 of receiving an online query from an electronic device of a user, activity 410 of obtaining a first set of rules that define an intent of the online query as at least one of a product-related intent or a non-product-related intent, and/or activity 415 of determining the intent of the online query based on the first set of rules (FIG. 4)).

In some embodiments, entity analysis module 514 can store computing instructions configured to run on one or more processing modules and perform one or more acts of method 400 (FIG. 4) (e.g. activity 420 of obtaining a second set of rules that define an entity prediction from the online query if the intent of the online query is determined to be the product-related intent, and activity 425 of predicting an entity from the online query based on the second set of rules (FIG. 4)). In some embodiments, mapping module 572 can store computing instructions configured to run on one or more processing modules and perform one or more acts of method 400 (FIG. 4) (e.g. activity 430 of mapping the entity predicted from the online query to product metadata associated with one or more products (FIG. 4)).

In some embodiments, location identification module 582 can store computing instructions configured to run on one or more processing modules and perform one or more acts of method 400 (FIG. 4) (e.g. activity 435 of determining a physical store that is closest to the electronic device when the online query is received from the electronic device of the user, and activity 440 of determining whether the one or more products are available for purchase at the physical store that is closest to the electronic device (FIG. 4)).

In some embodiments, personalization module 592 can store computing instructions configured to run on one or more processing modules and perform one or more acts of method 400 (FIG. 4) (e.g. activity 445 of obtaining a third set of rules that define a personalization of the one or more products for display on the electronic device of the user based on at least one of an online order history of the user, an in-store purchase history of the user, or an online browsing history of the user (FIG. 4)). In some embodiments, display module 562 can store computing instructions configured to run on one or more processing modules and perform one or more acts of method 400 (FIG. 4) (e.g. activity 450 of coordinating a display of the product information of the one or more products on the electronic device of the user (FIG. 4)).

Although mapping a predicted entity to a product based on a search query has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory storage devices storing computing instructions configured to run on the one or more processors and perform:
      receiving an online query from an electronic device of a user, the online query comprising natural language of the user;
      obtaining a first set of rules (1) comprising a neural network having a plurality of hidden layers, (2) defining an intent of the online query as at least one of a product-related intent or a non-product-related intent, and (3) operating as a function of at least:
         (i) a word vector;
         (ii) a total number of the plurality of hidden layers;
         (iii) a respective hidden dimension vector for each respective hidden layer of the plurality of hidden layers; and
         (iv) one or more training parameter matrices inserted into a sigmoid function;
      determining the intent of the online query based on the first set of rules;
      in response to determining that the intent is the product-related intent:
         obtaining a second set of rules that define an entity prediction from the online query;
         predicting an entity from the online query based on the second set of rules, the entity comprising one or more of a product name, a product attribute, a product price range, an average customer review, or a product brand;
         mapping the entity, as predicted from the online query, to product metadata associated with one or more products; and
         coordinating displaying product information of the one or more products on the electronic device of the user; and
      in response to determining that the intent is the non-product-related intent:
         determining, using the first set of rules, that the non-product-related intent comprises a request to file a complaint; and coordinating displaying a message on the electronic device of the user informing the user that a user support assistant has been notified of the request to file the complaint, wherein the first set of rules further comprises:

converting the online query into a sequence of word vectors $\{x_t\}^T$, where (a) x is the word vector, (b) t is an index of the plurality of hidden layers, (c) T is the total number of the plurality of hidden layers, and (d) each respective hidden layer of the plurality of hidden layers comprises:

(i) a respective hidden dimension vector $\{h_{t-1}\}^T$ input for the respective hidden dimension vector;

(ii) at least one respective corresponding word vector $\{x_t\}^T$ input; and (iii) a respective output $\{h_t\}^T$ for a next respective hidden layer of the plurality of hidden layers, where h is a hidden dimension; and applying a formula $h_t=\sigma(h_{t-1}H+x_tW)$, where H and W are respective training parameter matrices of the one or more training parameter matrices used to learn from training data, and σ is the sigmoid function.

2. The system of claim 1, wherein:
the one or more non-transitory storage devices storing the computing instructions are further configured to run on the one or more processors and perform, after determining that the intent is the product-related intent:
determining a physical store that is closest to the electronic device of the user; and
determining whether the one or more products are available for purchase at the physical store that is closest to the electronic device of the user; and
the product information comprises at least one of a price for the one or more products at the physical store or a location of the one or more products at the physical store.

3. The system of claim 1, wherein:
the one or more non-transitory storage devices storing the computing instructions are further configured to run on the one or more processors and perform, after determining that the intent is the product-related intent:
obtaining a third set of rules that define a personalization of the one or more products for display on the electronic device of the user based on at least one of an online order history of the user, an in-store purchase history of the user, or an online browsing history of the user; and
mapping the entity, as predicted from the online query, to the product metadata associated with the one or more products comprises mapping the entity, as predicted from the online query, to the product metadata associated with the one or more products based on the third set of rules.

4. The system of claim 1, wherein:
the one or more non-transitory storage devices storing the computing instructions are further configured to run on the one or more processors and perform, after determining the intent is the product-related intent:
determining a physical store that is closest to the electronic device of the user;
determining whether the one or more products are available for purchase in the physical store that is closest to the electronic device of the user; and
obtaining a third set of rules that define a personalization of the one or more products for display on the electronic device of the user based on at least one of an online order history of the user, an in-store purchase history of the user, or an online browsing history of the user;
mapping the entity, as predicted from the online query, to the product metadata associated with the one or more products comprises mapping the entity, as predicted from the online query, to the product metadata associated with the one or more products based on the third set of rules; and
the product information comprises at least one of a price for the one or more products at the physical store or a location of the one or more products at the physical store.

5. The system of claim 1, wherein predicting the entity from the online query based on the second set of rules comprises:
predicting a plurality of entities and a respective confidence level for each respective entity of the plurality of entities from the online query based on the second set of rules.

6. The system of claim 1, wherein:
the sigmoid function comprises $$\sigma(z) = \frac{1}{1+e^{-z}},$$

where z is a dummy variable and e is an exponential function; and
the first set of rules further comprises:
inserting the output from a last hidden layer $h_T$ into a softmax function to obtain a probability over a plurality of intents as $\hat{y}=s(h_T U+b)$, where $\hat{y}$ is a final output after softmax transformation, s is the softmax function $$s(z_i) = \frac{e^{z_i}}{\sum_{j=1}^{n} \sum_{j} e^{z_j}},$$

n is a total number of the plurality of intents, i and j are respective indexes for summation, and matrices $W \in R^{d \times h}$, $H \in R^{h \times h}$, $U \in R^{h \times n}$ and $b \in R^{1 \times h}$ are model parameters that are determined by model training, where R is defined as a real number set;
manually labeling each respective training example with a respective intent of the plurality of intents;
predicting a probability for each position in y to be 1 with the softmax function, where y is a one-hop vector that represents a true label of the online query, only a position corresponding to the respective intent, as manually labeled, takes value 1, and a remainder of positions in the one-hop vector take value 0;
optimizing the model parameters by minimizing cross-entropy loss using an equation comprising:

$$-\frac{1}{N}\sum_{k=1}^{N}\sum_{i=1}^{n} y_i^{(k)} \log(\hat{y}_i^{(k)})$$

where N is a number of training examples that effectively minimizes an error of model output ŷ compared with ground-truth label y;
using a stochastic gradient descent method for batch parameter optimization; and
calculating ŷ using optimized parameters and a highest probability intent of the plurality of intents, the highest probability intent having a highest probability given by ŷ as a final predicted intent to make a prediction after training.

7. The system of claim 1, wherein the second set of rules comprises:
determining context of a word in the online query by representing the context as a window comprising the word concatenated with additional words neighboring the word on both sides as $x^{(t)}=[x_{t-k}, \ldots, x_t, \ldots, x_{t+k}]$, where x is the word vector, t is an index of the plurality of hidden layers, $\{x_i\}_{i=t-k}^{t+k}$ is a word vector representation of word $x_t$ and the additional words, and k is a word window size;
predicting the entity of the word $x_t$;
calculating a hidden layer $h=\tanh(x^{(t)}W+b_1)$ to get a respective probability of each respective entity of a plurality of entities by using an equation comprising $\hat{y}=s(hU+b_2)$, where tan h is a hyperbolic tangent function, W is one or more first matrix variables for training, $b_1$ and $b_2$ are respective intercept variables for training, ŷ is an output from a logistic function, h is an output from a tan h function, s is a softmax function, and a ground-truth label of the entity for the word is represented as a one-hop vector y; and
optimizing parameters $W \in R^{(2k+1) \times h}$, $b_1 \in R^h$, $U \in R^{h \times n}$, $b_2 \in R^n$ by minimizing a cross-entropy loss using a stochastic gradient descent method and a batch optimization, where U is one or more second matrix variables for training, R is defined as a real number set, and h and n are dimensions of a matrix.

8. The system of claim 1, wherein:
the one or more non-transitory storage devices storing the computing instructions are further configured to run on the one or more processors and perform, after determining the intent is the product-related intent:
determining a physical store that is closest to the electronic device of the user;
determining whether the one or more products are available for purchase at the physical store that is closest to the electronic device of the user; and
obtaining a third set of rules that define a personalization of the one or more products for display on the electronic device of the user based on at least one of an online order history of the user, an in-store purchase history of the user, or an online browsing history of the user;
mapping the entity, as predicted from the online query, to the product metadata associated with the one or more products comprises mapping the entity, as predicted from the online query, to the product metadata associated with the one or more products based on the third set of rules;
the product information comprises at least one of a price for the one or more products at the physical store or a location of the one or more products at the physical store based on the third set of rules;
predicting the entity from the online query based on the second set of rules comprises predicting a plurality of entities and a respective confidence level for each respective entity of the plurality of entities from the online query based on the second set of rules;
the sigmoid function comprises $$\sigma(z) = \frac{1}{1+e^{-z}},$$

where z is a dummy variable and e is an exponential function;
the first set of rules further comprises:
inserting the output from a last hidden layer $h_T$ into a softmax function to obtain a probability over a plurality of intents as $\hat{y}=s(h_T U+b)$, where ŷ is a final output after softmax transformation, s is the softmax function $$s(z_i) = \frac{e^{z_i}}{\sum_{j=1}^{n} \sum_j e^{z_j}},$$

n is a total number of the plurality of intents, i and j are respective indexes for summation, and matrices $W \in R^{d \times h}$, $H \in R^{h \times h}$, $U \in R^{h \times n}$ and $b \in R^{1 \times h}$ are model parameters that are determined by model training, where R is defined as a real number set;
manually labeling each respective training example with a respective intent of the plurality of intents;
predicting a probability for each position in y to be 1 with the softmax function, where y is a one-hop vector that represents a true label of the online query, only a position corresponding to the respective intent, as manually labeled, takes value 1, and a remainder of positions in the one-hop vector take value 0;
optimizing the model parameters by minimizing cross-entropy loss using an equation comprising:

$$-\frac{1}{N}\sum_{k=1}^{N}\sum_{i=1}^{n} y_i^{(k)} \log(\hat{y}_i^{(k)})$$

where N is a number of training examples that effectively minimizes an error of model output ŷ compared with ground-truth label y;
using a stochastic gradient descent method for batch parameter optimization; and
calculating ŷ using optimized parameters and a highest probability intent of the plurality of intents, the highest probability intent having a highest probability given by ŷ as a final predicted intent to make a prediction after training; and
the second set of rules comprises:
determining context of a word in the online query by representing the context as a window comprising the word concatenated with additional words neighboring the word on both sides as $x^{(t)}=[x_{t-k}, \ldots, x_t, \ldots, x_{t+k}]$, where x is the word vector, t is an index of the plurality of hidden layers, $\{x_i\}_{i=t-k}^{t+k}$ is a word vector representation of word $x_t$ and the additional words, and k is a word window size;
predicting the entity of the word $x_t$;
calculating a hidden layer $h=\tanh(x^{(t)}W+b_1)$ to get a respective probability of each respective entity of a plurality of entities by using an equation comprising $\hat{y}=s(hU+b_2)$, where tan h is a hyperbolic tangent function, W is one or more first matrix variables for training, $b_1$ and $b_2$ are respective intercept variables for training, $\hat{y}$ is an output from a logistic function, h is an output from a tan h function, s is the softmax function, and a ground-truth label of the entity for the word is represented as a one-hop vector y; and optimizing parameters $W \in R^{(2k+1) \times h}$, $b_1 \in R^h$, $U \in R^{h \times n}$, $b_2 \in R^n$ by minimizing a cross-entropy loss using a stochastic gradient descent method and a batch optimization, where U is one or more second matrix variables for training, R is defined as a real number set, and h and n are dimensions of a matrix.

9. A method comprising:

receiving an online query from an electronic device of a user, the online query comprising natural language of the user;

obtaining a first set of rules (1) comprising a neural network having a plurality of hidden layers, (2) defining an intent of the online query as at least one of a product-related intent or a non-product-related intent, and (3) operating as a function of at least:
  (i) a word vector;
  (ii) a total number of the plurality of hidden layers;
  (iii) a respective hidden dimension vector for each respective hidden layer of the plurality of hidden layers; and
  (iv) one or more training parameter matrices inserted into a sigmoid function;

determining the intent of the online query based on the first set of rules;

in response to determining that the intent is the product-related intent:
  obtaining a second set of rules that define an entity prediction from the online query;
  predicting an entity from the online query based on the second set of rules, the entity comprising one or more of a product name, a product attribute, a product price range, an average customer review, or a product brand;
  mapping the entity, as predicted from the online query, to product metadata associated with one or more products; and
  coordinating displaying product information of the one or more products on the electronic device of the user; and in response to determining that the intent is the non-product-related intent:
  determining, using the first set of rules, that the non-product-related intent comprises a request to file a complaint; and
  coordinating displaying a message on the electronic device of the user informing the user that a user support assistant has been notified of the request to file the complaint, wherein the first set of rules further comprises:
    converting the online query into a sequence of word vectors $\{x_t\}^T$, where (a) x is the word vector, (b) t is an index of the plurality of hidden layers, (c) T is the total number of the plurality of hidden layers, and (d) each respective hidden layer of the plurality of hidden layers comprises:
      (i) a respective hidden dimension vector $\{h_{t-1}\}^T$ input for the respective hidden dimension vector;
      (ii) at least one respective corresponding word vector $\{x_t\}^T$ input; and
      (iii) a respective output $\{h_t\}^T$ for a next respective hidden layer of the plurality of hidden layers, where h is a hidden dimension; and
    applying a formula $h_t = \sigma(h_{t-1}H + x_t W)$, where H and W are respective training parameter matrices of the one or more training parameter matrices used to learn from training data, and $\sigma$ is the sigmoid function.

10. The method of claim 9, further comprising, after determining that the intent is the product-related intent:
  determining a physical store that is closest to the electronic device of the user; and
  determining whether the one or more products are available for purchase at the physical store that is closest to the electronic device of the user, wherein the product information comprises at least one of a price for the one or more products at the physical store or a location of the one or more products at the physical store.

11. The method of claim 9, wherein:
  the method further comprises, after determining that the intent is the product-related intent:
    obtaining a third set of rules that define a personalization of the one or more products for display on the electronic device of the user based on at least one of an online order history of the user, an in-store purchase history of the user, or an online browsing history of the user; and
    mapping the entity, as predicted from the online query, to the product metadata associated with the one or more products comprises mapping the entity, as predicted from the online query, to the product metadata associated with the one or more products based on the third set of rules.

12. The method of claim 9, wherein:
  the method further comprises, after determining that the intent is the product-related intent:
    determining a physical store that is closest to the electronic device of the user when the online query is received from the electronic device of the user;
    determining whether the one or more products are available for purchase in the physical store that is closest to the electronic device of the user; and
    obtaining a third set of rules that define a personalization of the one or more products for display on the electronic device of the user based on at least one of an online order history of the user, an in-store purchase history of the user, or an online browsing history of the user;
  mapping the entity, as predicted from the online query, to the product metadata associated with the one or more products comprises mapping the entity, as predicted from the online query, to the product metadata associated with the one or more products based on the third set of rules; and
  the product information comprises at least one of a price for the one or more products at the physical store or a location of the one or more products at the physical store.

13. The method of claim 9, wherein predicting the entity from the online query based on the second set of rules comprises:
  predicting a plurality of entities and a respective confidence level for each respective entity of the plurality of entities from the online query based on the second set of rules.

14. The method of claim 9, wherein:
the sigmoid function comprises $$\sigma(z) = \frac{1}{1+e^{-z}},$$

where z is a dummy variable and e is an exponential function; and
the first set of rules further comprises:
inserting the output from a last hidden layer $h_T$ into a softmax function to obtain a probability over a plurality of intents as $\hat{y}=s(h_T U+b)$, where $\hat{y}$ is a final output after softmax transformation, s is the softmax function $$s(z_i) = \frac{e^{z_i}}{\sum_{j=1}^{n} \sum_{j} e^{z_j}},$$

n is a total number of the plurality of intents, i and j are respective indexes for summation, and matrices $W \in R^{d \times h}$, $H \in R^{h \times n}$, $U \in R^{h \times n}$ and $b \in R^{1 \times h}$ are model parameters that are determined by model training, where R is defined as a real number set;
manually labeling each respective training example with a respective intent of the plurality of intents;
predicting a probability for each position in y to be 1 with the softmax function, where y is a one-hop vector that represents a true label of the online query, only a position corresponding to the respective intent, as manually labeled, takes value 1, and a remainder of positions in the one-hop vector take value 0;
optimizing the model parameters by minimizing cross-entropy loss using an equation comprising:

$$-\frac{1}{N} \sum_{k=1}^{N} \sum_{i=1}^{n} y_i^{(k)} \log(\hat{y}_i^{(k)})$$

where N is a number of training examples that effectively minimizes an error of model output $\hat{y}$ compared with ground-truth label y;
using a stochastic gradient descent method for batch parameter optimization; and
calculating $\hat{y}$ using optimized parameters and a highest probability intent of the plurality of intents, the highest probability intent having a highest probability given by $\hat{y}$ as a final predicted intent to make a prediction after training.

15. The method of claim 9, wherein the second set of rules comprises:
determining context of a word in the online query by representing the context as a window comprising the word concatenated with additional words neighboring the word on both sides as $x^{(t)}=[x_{t-k}, \ldots, x_t, \ldots, x_{t+k}]$, where x is the word vector, t is an index of the plurality of hidden layers, $\{x_i\}_{i=t-k}^{t+k}$ is a word vector representation of word $x_t$ and the additional words, and k is a word window size;
predicting the entity of the word $x_t$;
calculating a hidden layer $h = \tan h (x^{(t)} W + b_1)$ to get a respective probability of each respective entity of a plurality of entities by using an equation comprising $\hat{y}=s(hU+b_2)$, where tan h is a hyperbolic tangent function, W is one or more first matrix variables for training, $b_1$ and $b_2$ are respective intercept variables for training, $\hat{y}$ is an output from a logistic function, h is an output from a tan h function, s is a softmax function, and a ground-truth label of the entity for the word is represented as a one-hop vector y; and
optimizing parameters $W \in R^{(2k+1) \times h}$, $b_1 \in R^h$, $U \in R^{h \times n}$, $b_2 \in R^n$ by minimizing a cross-entropy loss using a stochastic gradient descent method and a batch optimization, where U is one or more second matrix variables for training, R is defined as a real number set, and h and n are dimensions of a matrix.

16. The method of claim 9, wherein:
the method further comprises:
determining a physical store that is closest to the electronic device of the user;
determining whether the one or more products are available for purchase at the physical store that is closest to the electronic device of the user; and
obtaining a third set of rules that define a personalization of the one or more products for display on the electronic device of the user based on at least one of an online order history of the user, an in-store purchase history of the user, or an online browsing history of the user;
mapping the entity, as predicted from the online query, to the product metadata associated with the one or more products comprises mapping the entity, as predicted from the online query, to the product metadata associated with the one or more products based on the third set of rules;
the product information comprises at least one of a price for the one or more products at the physical store or a location of the one or more products at the physical store based on the third set of rules;
predicting the entity from the online query based on the second set of rules comprises predicting a plurality of entities and a respective confidence level for each respective entity of the plurality of entities from the online query based on the second set of rules;
the sigmoid function comprises $$\sigma(z) = \frac{1}{1+e^{-z}},$$

where z is a dummy variable and e is an exponential function;
the first set of rules further comprises:
inserting the output from a last hidden layer $h_T$ into a softmax function to obtain a probability over a plurality of intents as $\hat{y}=s(h_T U+b)$, where $\hat{y}$ is a final output after softmax transformation, s is the softmax function $$s(z_i) = \frac{e^{z_i}}{\sum_{j=1}^{n} \sum_{j} e^{z_j}},$$

n is a total number of the plurality of intents, i and j are respective indexes for summation, and matrices $W \in R^{d \times h}$, $H \in R^{h \times n}$, $U \in R^{h \times n}$ and $b \in R^{1 \times h}$ are model parameters that are determined by model training, where R is defined as a real number set;

manually labeling each respective training example with a respective intent of the plurality of intents;
predicting a probability for each position in y to be 1 with the softmax function, where y is a one-hop vector that represents a true label of the online query, only a position corresponding to the respective intent, as manually labeled, takes value 1, and a remainder of positions in the one-hop vector take value 0;
optimizing the model parameters by minimizing cross-entropy loss using an equation comprising:

$$-\frac{1}{N}\sum_{k=1}^{N}\sum_{i=1}^{n}y_i^{(k)}\log(\hat{y}_i^{(k)})$$

where N is a number of training examples that effectively minimizes an error of model output ŷ compared with ground-truth label y;
using a stochastic gradient descent method for batch parameter optimization; and
calculating ŷ using optimized parameters and a highest probability intent of the plurality of intents, the highest probability intent having a highest probability given by ŷ as a final predicted intent to make a prediction after training; and
the second set of rules comprises:
determining context of a word in the online query by representing the context as a window comprising the word concatenated with additional words neighboring the word on both sides as $x^{(t)}=[x_{t-k}, \ldots, x_t, \ldots, x_{t+k}]$, where x is the word vector, t is an index of the plurality of hidden layers, $\{x_i\}_{i=t-k}^{t+k}$ is a word vector representation of word $x_t$ and the additional words, and k is a word window size;
predicting the entity of the word $x_t$;
calculating a hidden layer $h=\tan h\ (x^{(t)}W+b_1)$ to get a respective probability of each respective entity of a plurality of entities by using an equation comprising $\hat{y}=s(hU+b_2)$, where tan h is a hyperbolic tangent function, W is one or more first matrix variables for training, $b_1$ and $b_2$ are respective intercept variables for training, ŷ is an output from a logistic function, h is an output from a tan h function, s is the softmax function, and a ground-truth label of the entity for the word is represented as a one-hop vector y; and
optimizing parameters $W \in R^{(2k+1) \times h}$, $b_1 \in R^h$, $U \in R^{h \times n}$, $b_2 \in R^n$ by minimizing a cross-entropy loss using a stochastic gradient descent method and a batch optimization, where U is one or more second matrix variables for training, R is defined as a real number set, and h and n are dimensions of a matrix.

17. A system comprising:
one or more processors; and
one or more non-transitory storage devices storing computing instructions configured to run on the one or more processors and perform:
receiving an online query from an electronic device of a user, the online query comprising natural language of the user;
determining an intent of the online query as at least one of a product-related intent or a non-product-related intent using (1) a neural network having a plurality of hidden layers and (2) at least:
(i) a word vector;
(ii) a total number of the plurality of hidden layers;
(iii) a respective hidden dimension vector for each respective hidden layer of the plurality of hidden layers; and
(iv) one or more training parameter matrices inserted into a sigmoid function;
in response to determining the intent is the product-related intent:
predicting an entity from the online query, the entity comprising one or more of a product name, a product attribute, a product price range, an average customer review, or a product brand;
mapping the entity, as predicted from the online query, to product metadata associated with one or more products; and
coordinating displaying product information of the one or more products on the electronic device of the user;
in response to determining that the intent is the non-product-related intent:
determining, using a first set of rules, that the non-product-related intent comprises a request to file a complaint; and
coordinating displaying a message on the electronic device of the user informing the user that a user support assistant has been notified of the request to file the complaint, wherein the first set of rules further comprises:
converting the online query into a sequence of word vectors $\{x_t\}^T$, where (a) x is the word vector, (b) t is an index of the plurality of hidden layers, (c) T is the total number of the plurality of hidden layers, and (d) each respective hidden layer of the plurality of hidden layers comprises:
(i) a respective hidden dimension vector $\{h_{t-1}\}^T$ input for the respective hidden dimension vector;
(ii) at least one respective corresponding word vector $\{x_t\}^T$ input; and
(iii) a respective output $\{h_t\}^T$ for a next respective hidden layer of the plurality of hidden layers, where h is a hidden dimension; and
applying a formula $h_t=\sigma(h_{t-1}H+x_tW)$, where H and W are respective training parameter matrices of the one or more training parameter matrices used to learn from training data, and σ is the sigmoid function.

18. The system of claim 17, wherein:
the one or more non-transitory storage devices storing the computing instructions are further configured to run on the one or more processors and perform, after determining that the intent is the product-related intent:
determining a physical store that is closest to the electronic device of the user; and
determining whether the one or more products are available for purchase at the physical store that is closest to the electronic device of the user; and
the product information comprises at least one of a price for the one or more products at the physical store or a location of the one or more products at the physical store.

19. The system of claim 17, wherein mapping the entity, as predicted from the online query, to the product metadata associated with the one or more products comprises:
mapping the entity, as predicted from the online query, to the product metadata associated with the one or more products based on at least one of an online order history of the user, an in-store purchase history of the user, or a browsing history of the user.

20. The system of claim 17, wherein:
the one or more non-transitory storage devices storing the computing instructions are further configured to run on the one or more processors and perform, after determining that the intent is the product-related intent:
  determining a physical store that is closest to the electronic device of the user;
  determining whether the one or more products are available for purchase in the physical store that is closest to the electronic device of the user; and
  determining a personalization of the one or more products to the user based on at least one of an online order history of the user, an in-store purchase history of the user, or a browsing history of the user;
mapping the entity, as predicted from the online query, to the product metadata associated with the one or more products comprises mapping the entity, as predicted from the online query, to the product metadata associated with the one or more products based on the personalization of the one or more products; and
the product information comprises at least one of a price for the one or more products at the physical store or a location of the one or more products at the physical store based on the personalization of the one or more products.

* * * * *